(12) United States Patent
Yoakum et al.

(10) Patent No.: US 11,068,810 B2
(45) Date of Patent: Jul. 20, 2021

(54) MATCHING DEPLOYABLE RESOURCES WITH AVAILABLE TASKS BASED ON PERSONAL INFORMATION OBTAINED FROM WEARABLE DEVICES

(71) Applicant: Avaya Inc., Santa Clara, CA (US)

(72) Inventors: John H. Yoakum, Cary, NC (US); Jonathan Silverman, Minneapolis, MN (US); Cynthia S. Mitchell, Windsor, CO (US)

(73) Assignee: Avaya Inc., Santa Clara, CA (US)

( * ) Notice: Subject to any disclaimer, the term of this patent is extended or adjusted under 35 U.S.C. 154(b) by 1143 days.

(21) Appl. No.: 14/971,592

(22) Filed: Dec. 16, 2015

(65) Prior Publication Data

US 2017/0178040 A1 Jun. 22, 2017

(51) Int. Cl.
  *G06Q 10/06* (2012.01)
(52) U.S. Cl.
  CPC .............................. *G06Q 10/06311* (2013.01)
(58) Field of Classification Search
  USPC ................................................. 705/7.11–7.42
  See application file for complete search history.

(56) References Cited

U.S. PATENT DOCUMENTS 9,210,528 B2 * 12/2015 Naqvi ................... H04W 4/021
10,133,983 B1 * 11/2018 Chelian .................. G06N 7/005
2015/0135310 A1 * 5/2015 Lee ..................... H04W 12/065
  726/20
2016/0300178 A1 * 10/2016 Perry ............ G06Q 10/063116
2016/0303969 A1 * 10/2016 Akula .................. A61B 5/7475

OTHER PUBLICATIONS

Liu, et al., Device-to-Device Communication in LTE-Advanced Networks: A Survey, IEEE Communication Surveys & Tutorials, IEEE Communications Surveys & Tutorials, 2014. (Year: 2014).*

* cited by examiner

*Primary Examiner* — Amber A Misiaszek
(74) *Attorney, Agent, or Firm* — Sheridan Ross P.C.

(57) ABSTRACT

Matching deployable resources with available tasks based on personal information obtained from wearable devices is disclosed. A processor-based controller receives permission from each of a plurality of deployable resources to receive personal information from the respective deployable resource. The controller next automatically receives personal information from each of the plurality of deployable resources via the wearable devices. The personal information is based on information determined by the respective wearable device while the wearable device is being worn by the respective deployable resource. The controller automatically compares the personal information received from one or more of the deployable resources to a selection criterion associated with a task. Based on the comparing, the controller selects one or more of the deployable resources, and notifies each of the selected deployable resources to request assistance with respect to the task.

20 Claims, 12 Drawing Sheets

MATCHING DEPLOYABLE RESOURCES WITH AVAILABLE TASKS BASED ON PERSONAL INFORMATION OBTAINED FROM WEARABLE DEVICES

CROSS-REFERENCE TO RELATED APPLICATIONS

This application is related to U.S. patent application Ser. No. 14/971,501 filed on Dec. 16, 2015, entitled "SELECTING DEPLOYABLE RESOURCES BASED ON PERSONAL INFORMATION OBTAINED FROM WEARABLE DEVICES," which is hereby incorporated herein by reference in its entirety.

This application is related to U.S. patent application Ser. No. 14/971,554 filed on Dec. 16, 2015, entitled "AUTHORIZING DEPLOYABLE RESOURCES BASED ON PERSONAL INFORMATION OBTAINED FROM WEARABLE DEVICES," which is hereby incorporated herein by reference in its entirety.

BACKGROUND

Wearable devices, such as smartwatches and fitness trackers, are capable of tracking a wide range of data about a wearer. For example, many wearable devices are able to track activity levels, sleep cycles, heartbeat, and other health-related parameters. This data may be stored and indexed, for example via a smartphone, personal computer, or the device itself, and can be made available for a wide variety of applications.

SUMMARY OF THE DETAILED DESCRIPTION

Embodiments disclosed in the detailed description include matching deployable resources with available tasks based on personal information obtained from wearable devices. In one embodiment, a method of matching deployable resources with available tasks is disclosed. The method comprises receiving permission, at a processor-based controller, from one or more deployable resources of a plurality of deployable resources to receive personal information from the respective deployable resource. The method further comprises automatically receiving, via the processor-based controller, personal information from the one or more deployable resources of the plurality of deployable resources via the respective wearable devices configured to be worn by the plurality of deployable resources, the personal information based on information determined by the respective wearable device while the wearable device is being worn by the respective deployable resource. The method further comprises automatically comparing, via the processor-based controller, the personal information received from a first subset of the plurality of deployable resources to a selection criterion associated with a task. The method further comprises selecting, based on the comparing of the personal information to the selection criterion, a second subset of deployable resources from the first subset of the plurality of deployable resources. The method further comprises notifying each deployable resource of the second subset of deployable resources to request assistance from the second subset of deployable resources with respect to the task.

In another embodiment, a system for matching deployable resources with available tasks is disclosed. The system comprises a plurality of wearable devices, each of the plurality of wearable devices configured to be worn by one of a plurality of deployable resources. Each of the plurality of wearable devices is configured to determine personal information about the respective deployable resource while the wearable device is being worn by the respective deployable resource. The system further comprises a processor-based controller configured to receive permission from one or more deployable resources of the plurality of deployable resources to receive personal information from the respective deployable resource. The processor-based controller is further configured to automatically receive the personal information from the one or more deployable resources of the plurality of deployable resources via the respective wearable devices configured to be worn by the plurality of deployable resources. The processor-based controller is further configured to automatically compare the personal information received from a first subset of the plurality of deployable resources to a selection criterion associated with a task. The processor-based controller is further configured to select, based on the comparing of the personal information to the selection criterion, a second subset of deployable resources from the first subset of the plurality of deployable resources. The processor-based controller is further configured to cause each deployable resource of the second subset of deployable resources to be notified to request assistance from the second subset of deployable resources with respect to the task.

In another embodiment, a non-transitory computer-readable medium storing one or more programs is disclosed. The one or more programs comprise instructions, which when executed by an electronic device cause the electronic device to implement a method for matching deployable resources with available tasks. The method comprises receiving permission, at a processor-based controller, from one or more deployable resources of a plurality of deployable resources to receive personal information from the respective deployable resource. The method further comprises automatically receiving, via the processor-based controller, personal information from the one or more deployable resources of the plurality of deployable resources via the respective wearable devices configured to be worn by the plurality of deployable resources. The personal information is based on information determined by the respective wearable device while the wearable device is being worn by the respective deployable resource. The method further comprises automatically comparing, via the processor-based controller, the personal information received from a first subset of the plurality of deployable resources to a selection criterion associated with a task. The method further comprises selecting, based on the comparing of the personal information to the selection criterion, a second subset of deployable resources from the first subset of deployable resources. The method further comprises notifying each deployable resource of the second subset of deployable resources to request assistance from the second subset of deployable resources with respect to the task.

BRIEF DESCRIPTION OF THE FIGURES

The accompanying drawing figures incorporated in and forming a part of this specification illustrate several aspects of the disclosure, and together with the description serve to explain the principles of the disclosure.

Figure 1:
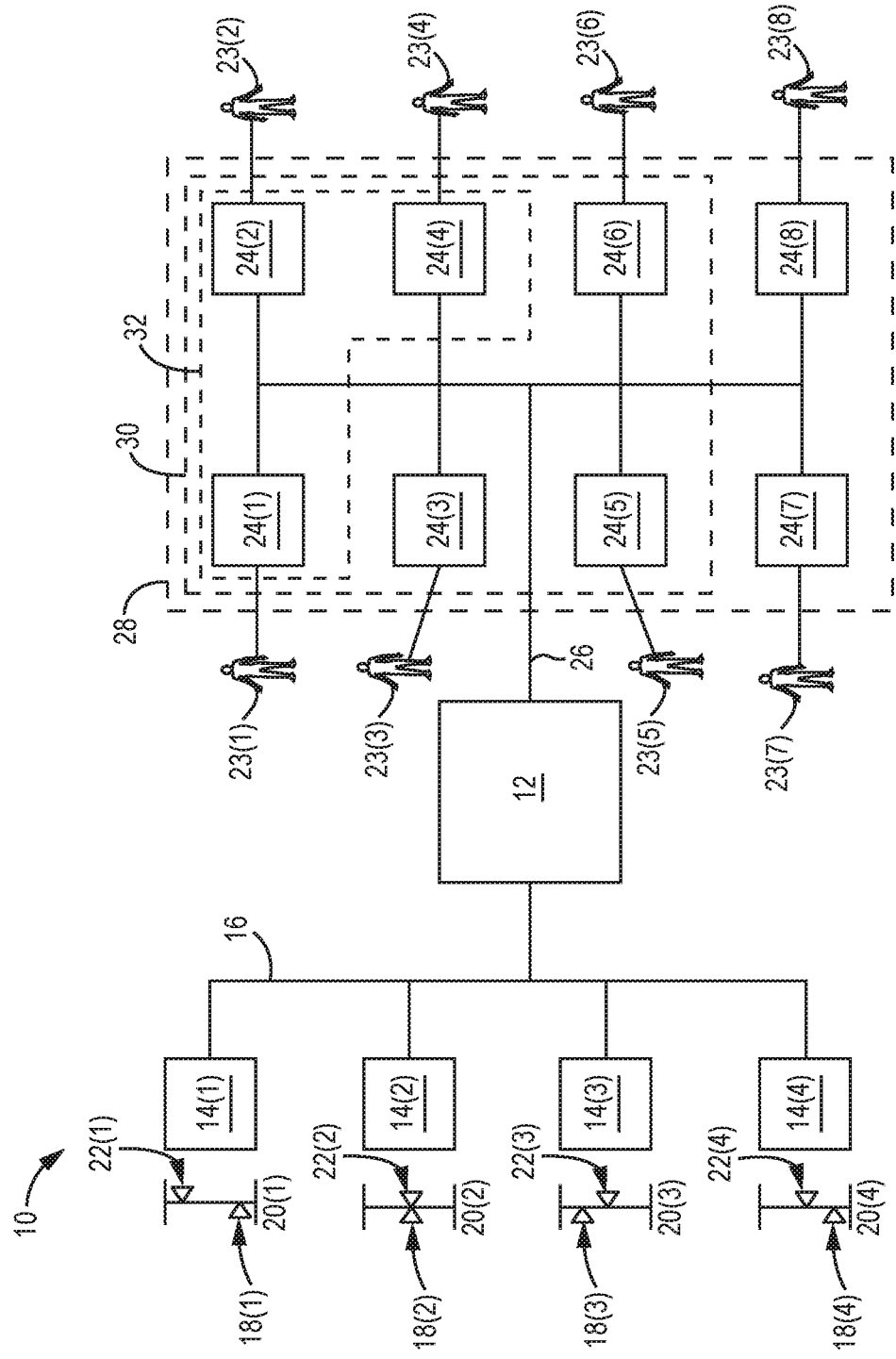
FIG. 1 illustrates a system configured to select deployable resources based on a comparison of personal information received from wearable devices worn by the deployable resources to one or more selection criteria, according to an embodiment.

The foregoing summary, as well as the following detailed description of certain embodiments, will be better understood when read in conjunction with the appended drawings. For purposes of illustration, certain embodiments are shown in the drawings. It should be understood, however, that the embodiments are not limited to the arrangements and instrumentality shown in the attached drawings.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

As used herein, the articles "a" and "an" in reference to a feature, such as "a wearable device," refer to "one or more" of the feature, such as "one or more wearable devices," unless otherwise specified.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first wearable device" and "second wearable device," and does not imply a priority, a type, an importance, or other attribute, unless otherwise stated herein.

Embodiments disclosed in the detailed description include matching deployable resources with available tasks based on personal information obtained from wearable devices. In one embodiment, a processor-based controller receives permission from one or more deployable resources of a plurality of deployable resources to receive personal information from the respective deployable resource. The processor-based controller automatically receives personal information from the one or more deployable resources of the plurality of deployable resources via the respective wearable devices, in response to receiving permission to receive the personal information. The personal information is based on information determined by the respective wearable device while the wearable device is being worn by the respective deployable resource. The processor-based controller automatically compares the personal information received from one or more of the plurality of deployable resources to a selection criterion associated with a task. Based on the comparing, the processor-based controller selects one or more of the deployable resources, and notifies each deployable resource of the selected deployable resources to request assistance with respect to the task. One advantage of this arrangement is that a deployable resource, such as a freelance contractor for example, can voluntarily provide personal information via a wearable device that can aid in matching the deployable resource with a task quickly and efficiently. These and other aspects are described below in detail, particularly in relation to the embodiments shown by FIGS. 7-9.

Many contact centers use workforce management (WFM) applications to forecast and schedule the number of deployable resources (e.g., agents) with specific skills that they will need. The WFM applications use historical data for contact traffic and desired service levels to forecast future contact volume. The forecast is used to create schedules based on availability, skills, attendance, etc. from a pool of deployable resources, often a week to a month in advance. During a work day, a WFM system can provide agents, e.g., managers, of the contact center with information about the forecasted contact load versus actual contact load, adherence to schedule by deployable resources, and projected contact volume and service level for the remainder of the day. If these assumptions prove to be inaccurate, however, then the contact load may not be handled in a timeframe that matches the specified service level. For example, contact volume may far exceed the forecast, or there may be excessive agent absenteeism due to inclement weather or illness.

In this regard, FIG. 1 illustrates a system 10 for selecting deployable resources, according to an embodiment. The system 10 includes a processor-based controller 12 in communication with a plurality of contact centers 14 via one or more communication connections 16. In this embodiment, the controller 12 automatically determines a contact load parameter 18 for a contact center 14. In these and other embodiments, the contact load parameter 18 may be a single parameter or a set of parameters, as desired. For example, contact load parameters 18 for intra-day scheduling of contact center agents may include customer contacts across a set of different communication channels, the skill sets and competencies of currently working agents, and the service levels being experienced by customers.

As used herein, the term "automatically" refers to actions taken by the controller 12 or other devices in response to a determination or condition and without human input. The controller 12 also automatically determines, based on a load capacity parameter 20, a contact load threshold 22 for the contact center 14. In some embodiments the contact load parameter 18 may be a current contact volume or a ratio of a current contact volume to a current contact capacity. Likewise, the contact load threshold 22 may be a predetermined contact volume, or a predetermined ratio of contact volume to contact capacity. The controller 12 automatically compares the contact load parameter 18 to the contact load threshold 22. In these and other embodiments, the contact load threshold 22 may be a single threshold or a set of thresholds, as desired. For example, the contact load threshold 22 may be based on a forecast for the remainder of the current day for the contact center 14, or may be based on a desired service level associated with the contact center 14. If the contact load parameter 18 for the contact center 14 exceeds the contact load threshold 22, e.g., the desired service level, the controller 12 automatically selects one or more deployable resources 23, each of which is wearing a wearable device 24 in communication with the controller 12 via one or more communication connections 26. It should be understood that communication connections 16, 26 may include data or network connections, for example, and may also be directly or indirectly connected via a cloud-based network, for example.

The deployable resources 23 form a resource pool 28, with each deployable resource 23 providing personal information to the controller 12 via a respective wearable device 24. Each deployable resource 23 may have a preexisting relationship with an entity responsible for aspects of the contact center 14, for example as an employee or a contractor. As will be discussed in detail below, a suitable wearable device 24 may include a smartwatch, fitness tracker, or other electronic device that is configured to be worn by a person and is capable of collecting, storing and/or communicating personal information about the wearer to another electronic device, such as the controller 12 for example. The wearable device 24 may be able to determine a wide variety of personal information, including for example, biometric information such as heart rate, blood pressure, rest and sleep status, current activity or physical exertion, and activity over time.

The controller 12 receives personal information about each deployable resource 23 of a first group 30 of the resource pool 28 via a respective wearable device 24. In this embodiment, for example, the resource pool 28 includes deployable resources 23(1)-23(8), and the first group 30 of deployable resources 23 is a subset including deployable resources 23(1)-23(6).

In this embodiment, the personal information is based on information determined by the wearable device 24 while the wearable device 24 is being worn by the respective deployable resource 23. The personal information may include, for example, location information such as a proximity to a contact center 14, or personal characteristics relating to job readiness, such as a rest state or BAC level. The controller 12 compares the personal information to a selection criterion for each deployable resource 23 in the first group 30, and selects one or more deployable resources 23 based on the comparisons. For example, a selection criterion may be a proximity of the deployable resource 23 to a contact center 14, or may include a determination that the deployable resource 23 is sufficiently rested to assist at the contact center 14, for example. In this embodiment, the selected deployable resources 23 are part of a second group 32 that meets the one or more selection criteria. The second group 32 is a subset of the first group 30 that includes deployable resources 23(1), 23(2), and 23(4). It should also be understood that the selecting may include dividing the deployable resources 23 into different groups, categories, or rankings based on the comparing, for example to more efficiently select the preferred deployable resources 23 and to have backup deployable resources 23 that can be selected if the preferred deployable resources 23 are not available.

The selected deployable resources 23 in the second group 32 are then notified to request their assistance with respect to the contact center 14. One advantage of this arrangement is that deployable resources 23 may be dynamically selected in real time based on changing requirements at one or more contact centers 14 and on personal information of individual deployable resources 23. For example, in this embodiment, contact center 14(1) has a contact load threshold 22 that is greater than its contact load parameter 18. Contact center 14(4) has a lower contact load threshold 22(4) than contact center 14(1), but also has a lower contact load parameter 18(4). Thus, no action is taken with respect to contact centers 14(1) or 14(4). However, the contact load parameter 18(2) of contact center 14(2) is equal to the contact load threshold 22(2) of contact center 14(2), which triggers the controller 12 to automatically select deployable resources 23 from the resource pool 28 based on the personal information received from the wearable devices 24 associated with one or more of the deployable resources 23. Likewise, contact center 14(3) has a contact load parameter 18(3) of contact center 14(3) is greater than the contact load threshold 22(3), which also triggers the controller 12 to automatically select deployable resources 23 from the resource pool 28.

It should be understood that a contact load threshold 22 may be determined based on a number of factors, such as, for example, historical or expected call volume at the contact center 14, unavailability of one or more normally scheduled resources at the contact center 14, or other factors that may raise or lower the contact load threshold 22 required to trigger the controller 12 from selecting deployable resources 23 from the resource pool 28. In this manner, if one contact center 14 is experiencing call volume that is higher than its current capacity, an off-duty resource, such as a deployable resource 23 normally associated with another contact center 14 for example, may be automatically contacted to request assistance, based on specific criteria including current proximity to the contact center 14, or personal characteristics relating to job readiness, such as rest state or BAC level of the deployable resource 23, for example.

Figure 2:
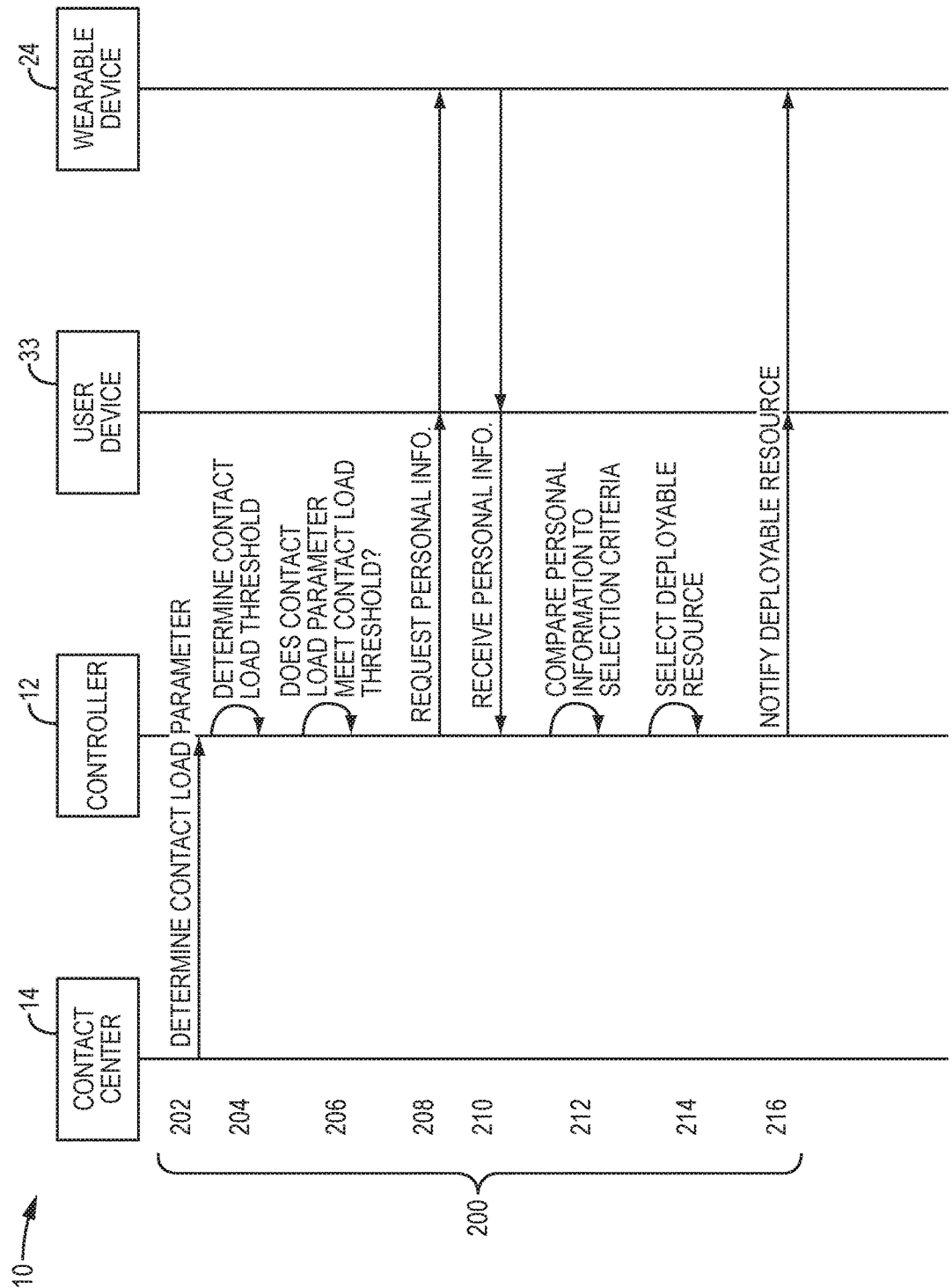
FIG. 2 is a communication diagram illustrating a method of selecting deployable resources using the system of FIG. 1, according to an embodiment.
Figure 3:
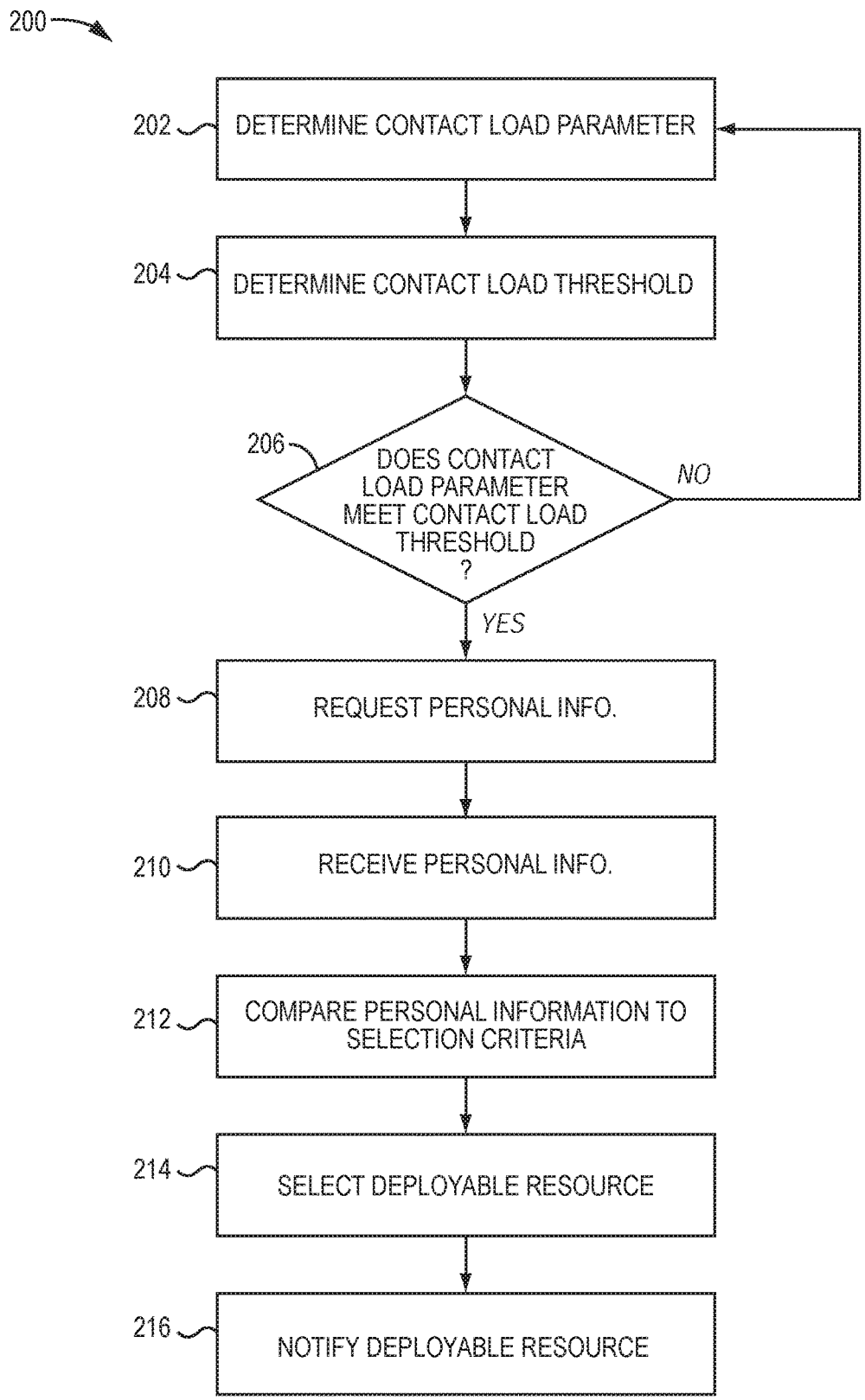
FIG. 3 is a flowchart of the method of FIG. 2, according to an embodiment.

FIG. 2 is a communication diagram illustrating a method 200 of selecting deployable resources 23 using the system 10 of FIG. 1, according to an embodiment. Reference is also made to FIG. 3, which illustrates a flowchart of the method 200 of FIG. 2, according to an embodiment. In this embodiment, a controller 12 is in communication with a contact center 14. It should be understood that in some embodiments, the controller 12 may be part of the contact center 14, or may be physically separated from the contact center 14. The controller 12 is also in communication with a user device 33 associated with a deployable resource 23, such as a personal computer or a smartphone in the possession or control of the deployable resource 23, for example. The user device 33 in this example receives the personal information from the wearable device 24 worn by the deployable resource 23, for example via wired synchronization, such as universal serial bus (USB) or Ethernet for example, or wireless synchronization, such as cellular, Wi-Fi or Bluetooth, for example. In some embodiments, the wearable device 24 may alternatively or additionally be in communication with the controller 12 directly, such as via an Internet or other network-based connection.

In the method 200, the controller 12 first determines a contact load parameter 18 based on information received from the contact center 14 (Block 202). Next, the controller 12 determines a contact load threshold 22 (Block 204) and compares the contact load parameter 18 to the contact load threshold 22. If it is determined that the contact load parameter 18 does not meet the contact load threshold 22, the process returns to Block 202. On the other hand, if it is determined that the contact load parameter 18 meets or exceeds the contact load threshold 22, the controller 12 requests personal information from the user device 33, which may then request the personal information from the wearable device 24 (Block 208). Alternatively, the user device 33 may be configured to periodically receive the personal information from the wearable device 24, so that the user device 33 can provide stored personal information to the controller 12 as needed without directly requesting the personal information from the wearable device 24. Alternatively, as discussed above, the controller 12 may also request the personal information from the wearable device 24 directly, bypassing the user device 33.

Next, the controller 12 receives the personal information from the user device 33 and/or the wearable device 24 (Block 210). The controller 12 compares the personal information to one or more selection criteria (Block 212). If the personal information associated with the deployable resource 23 meets the selection criteria, the deployable resource 23 is selected (Block 214), and the deployable resource 23 may be notified of the selection (Block 216) in order to request assistance from the deployable resource 23. In this embodiment, for example, a text, audio, video, or other notification may be sent to the user device 33 and/or wearable device 24. The deployable resource 23 may then reply, and can be assigned to report to the contact center 14.

In another embodiment, a system for authorizing deployable resources based on personal information obtained from wearable devices is disclosed. Many industries such as the trucking and airline industries have regulations that require deployable resources to work a maximum amount of time during a given time period and to rest for a specified amount of time in between work shifts. The standards exist to protect the safety of the deployable resource and people proximate to the deployable resource during the task. Failure of the deployable resource to adhere to these work requirements may put the deployable resource and their company at risk for physical injury as well as accident liability.

Figure 4:
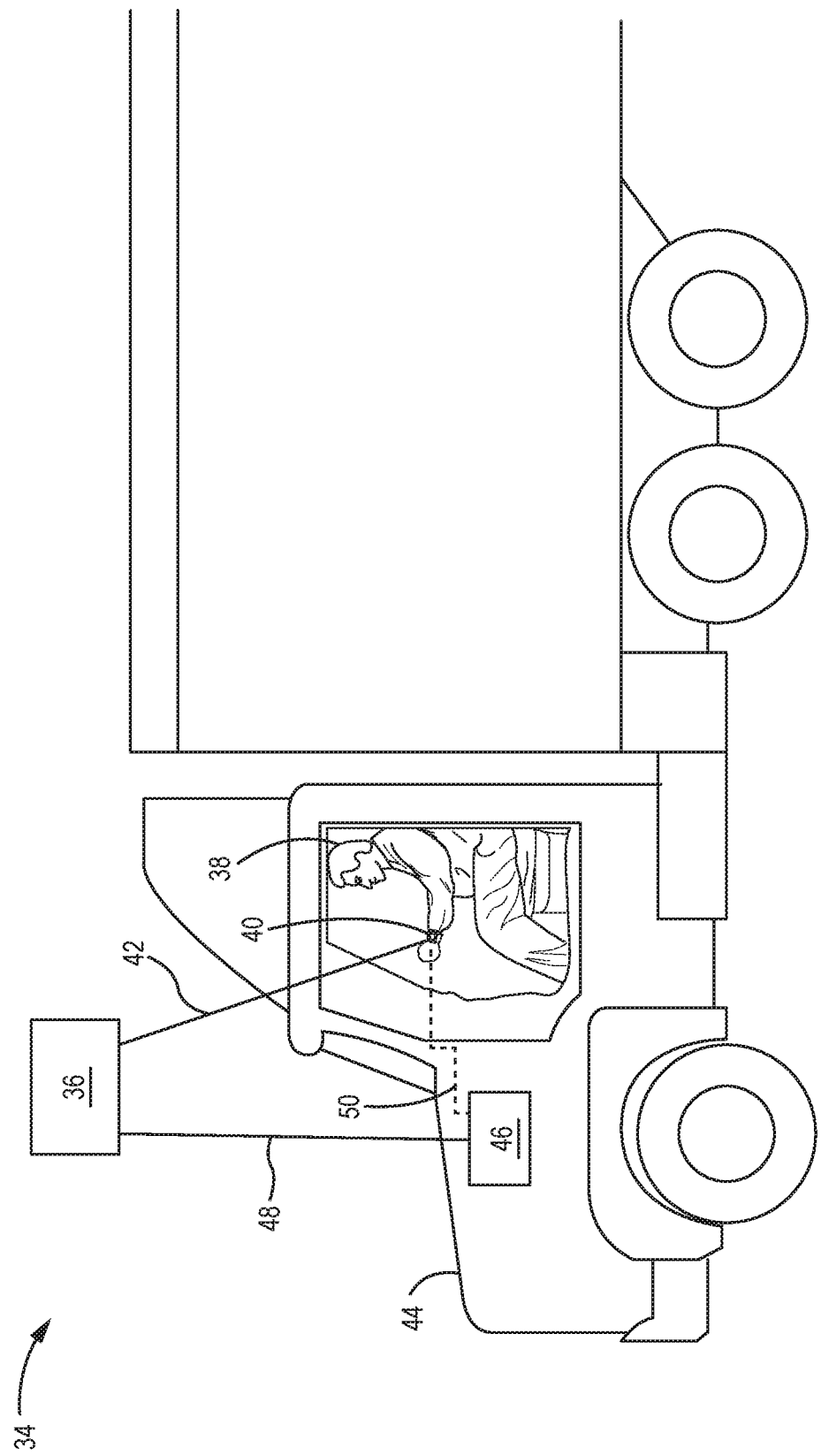
FIG. 4 illustrates a vehicle in communication with a processor-based controller configured to determine whether one or more deployable resources are permitted to proceed with operating the vehicle, based on personal information received from wearable devices worn by the deployable resources, according to another embodiment.

In this regard, FIG. 4 illustrates a system for managing deployable resources 38 according to an embodiment. In this embodiment, a system 34 includes a processor-based controller 36 configured to manage a deployable resource 38 using personal information received from a wearable device 40 configured to be worn by the deployable resource 38. In this embodiment, the wearable device 40 is connected to the controller 36 by a communication connection 42, but it should be understood that the controller 36 may be configured to receive the personal information in other ways in addition to, or instead of, communication connection 42, for example. In this embodiment, the controller 36 is configured to manage access by the deployable resource 38 to a vehicle 44. In this embodiment, the vehicle 44 includes a processor-based vehicle controller 46 that is connected to the controller 36 by a communication connection 48. In this embodiment, the wearable device 40 may also be connected to the vehicle controller 46 by a communication connection 50.

In this embodiment, when the deployable resource 38 begins a task, such as operating the vehicle 44 for example, the controller 36 receives personal information from the wearable device 40 relating to the deployable resource 38. As discussed above, the personal information may relate to a job requirement, prerequisite legal criteria, or other predetermined criteria that are relevant to the task of operating the vehicle 44. Some examples of criteria include a minimum amount of rest in a predetermined time period before operating the vehicle 44, a maximum amount of time performing other tasks within a predetermined time period before operating the vehicle 44, a maximum BAC level immediately prior to or over a predetermined time prior to operating the vehicle 44, etc. In some embodiments, the controller 36 and/or vehicle controller 46 may actively prevent the deployable resource 38 from operating the vehicle 44 if one or more criteria are not met. For example, if the controller 36 and/or vehicle controller 46 determine that one or more criteria have not been satisfied, the vehicle 44 may display an alert viewable by the deployable resource 38, deliver a notification to the wearable device 40 or other device associated with the deployable resource 38, notify a superior of the deployable resource 38, deactivate a vehicle 44 ignition or otherwise prevent operation of the vehicle 44, and/or other steps to prevent operation of the vehicle 44 by the deployable resource 38.

Figure 5:
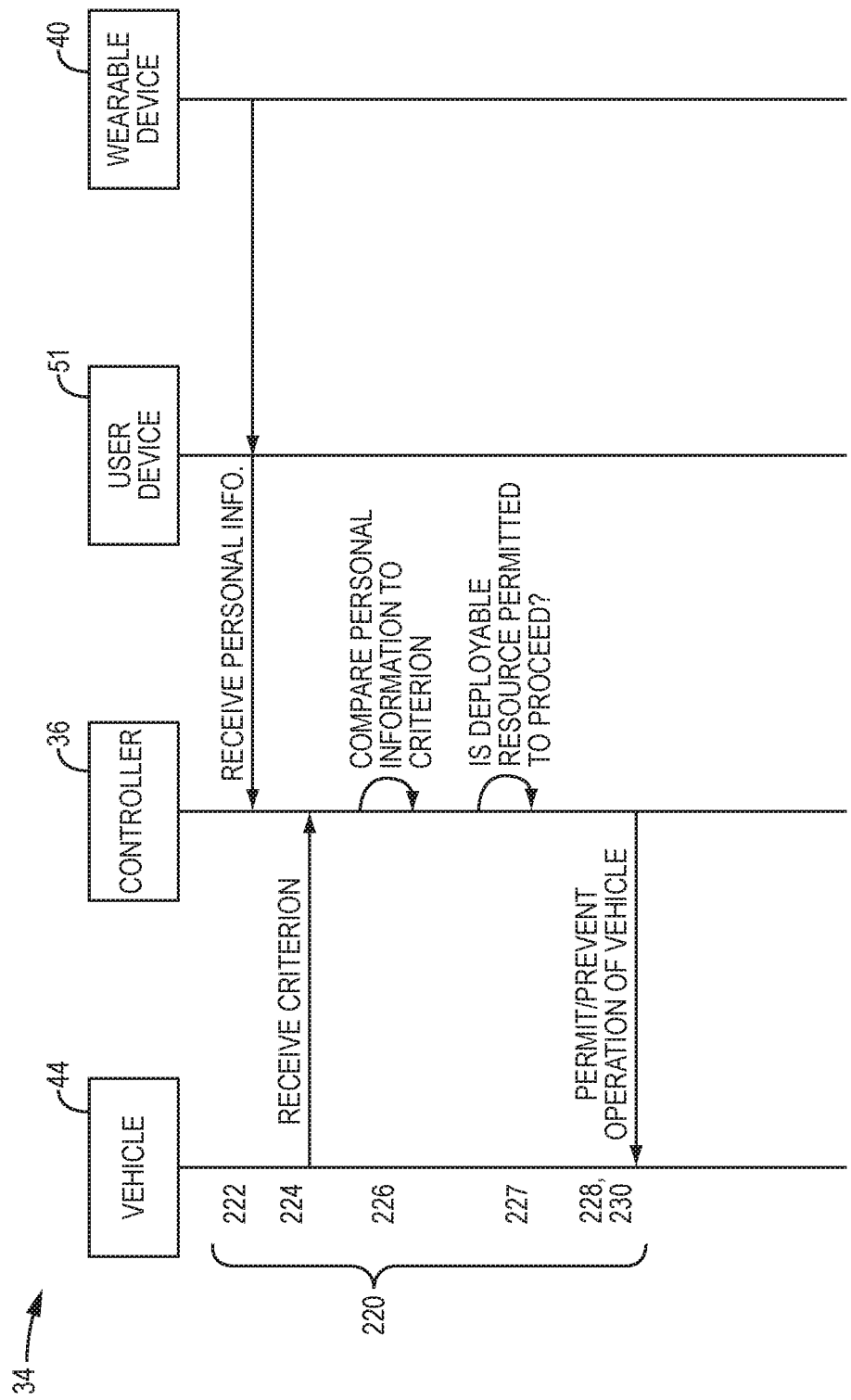
FIG. 5 is a communication diagram illustrating a method of determining whether a deployable resource is permitted to proceed a task using the system of FIG. 4, according to an embodiment.
Figure 6:
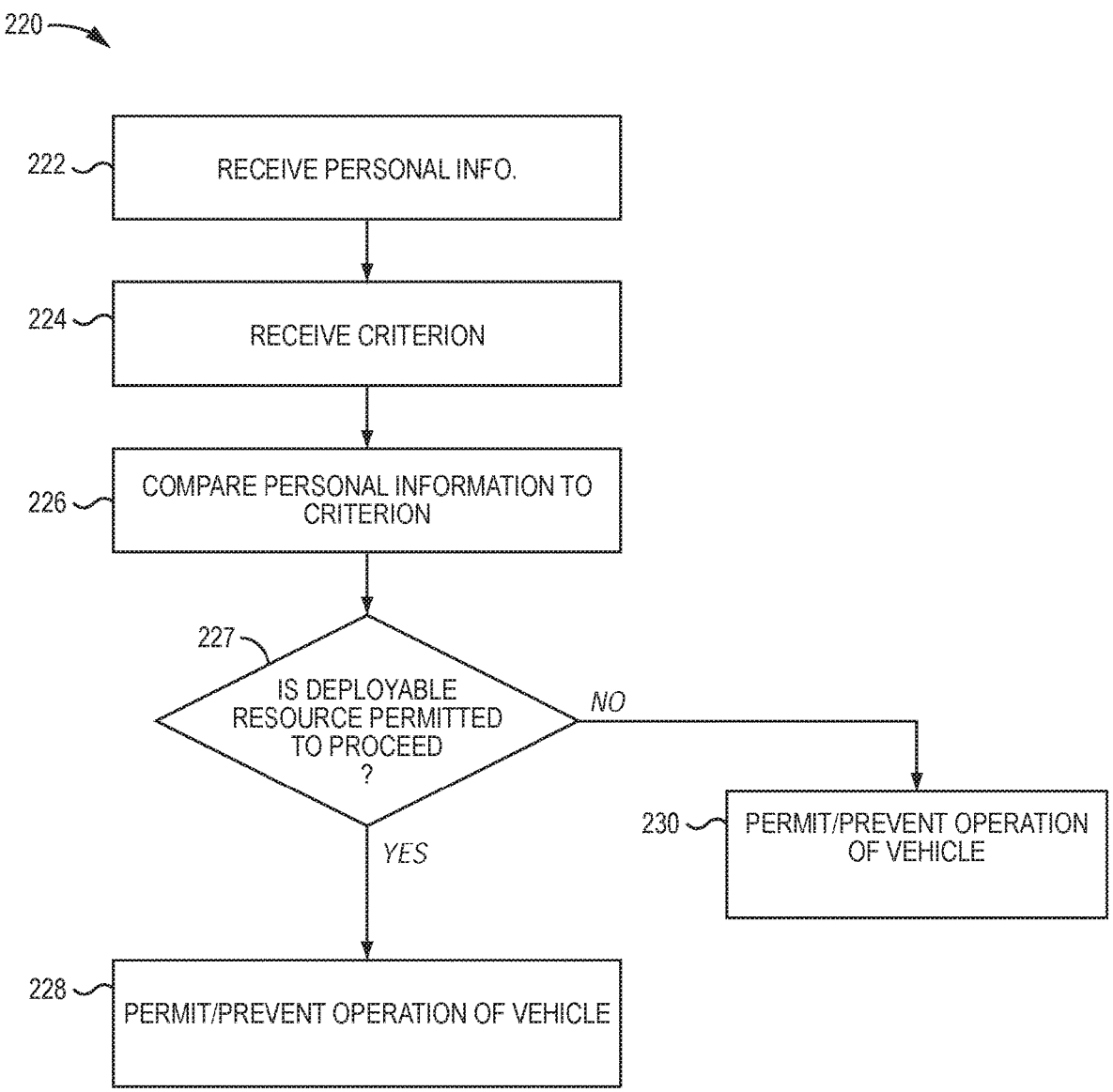
FIG. 6 is a flowchart of the method of FIG. 5, according to an embodiment.

FIG. 5 is a communication diagram illustrating a method 220 of managing deployable resources 38 using the system 34 of FIG. 4, according to an embodiment. Reference is also made to FIG. 6, which illustrates a flowchart of the method 220 of FIG. 5, according to an embodiment. In this embodiment, the controller 36 is in communication with the vehicle 44. It should be understood that in some embodiments, the controller 36 may be part of the vehicle 44, for example as part of the vehicle controller 46, or may be physically separated from the vehicle 44. The controller 36 is also in communication with a user device 51 associated with a deployable resource 38, such as a personal computer or a smartphone in the possession or control of the deployable resource 38, for example. The user device 51 in this example receives the personal information from the wearable device 40 worn by the deployable resource 38, for example via wired synchronization or wireless synchronization discussed above with respect to FIG. 2. In some embodiments, the wearable device 40 may alternatively or additionally be in communication with the controller 36 directly, as discussed above with respect to FIG. 2.

In the method 220, the controller 36 automatically receives personal information about a deployable resource 38 via a wearable device 40 worn by the deployable resource 38 (Block 222). The controller 36 may also receive a criterion from the vehicle 44, for example relating to a requirement for operating the vehicle 44 (Block 224). In another embodiment, the criterion may be a predetermined criterion stored by the controller 36. The controller 36 automatically compares the personal information of the deployable resource 38 to the criterion associated with the task (Block 226). The comparing may take place at a predetermined time, such as at or before a predetermined start time for the task, or may take place periodically or continuously over time, for example. The controller 36 next automatically determines, based on the comparing, whether the deployable resource 38 is permitted to proceed with the task (Block 227). If the controller 36 determines, based on the comparison, that the deployable resource 38 is permitted to proceed with the task, the controller 36 permits the deployable resource 38 to proceed with the task (Block 228).

On the other hand, if the controller 36 determined that the deployable resource 38 is not permitted to proceed with the task, the controller 36 may take steps in this embodiment to prevent the deployable resource 38 from performing the task (Block 230). In these and other embodiments, the controller 36 may be configured to provide information relating to the method 220 to an audit log that documents and preserves the information. This audit log can aid in compliance with laws, regulations, or other requirements relating to the task, and can also limit liability for an entity associated with the task. For example, changes in sleep/rest status, location, BAC levels, or other information may be logged. In addition, the audit trail may record whether or not the entity authorized the deployable resource 38 to perform the task starting at a specified time based on the data collected from the wearable device 40.

It should be understood that aspects of these embodiments have a variety of different applications. For example, in the embodiment above, the vehicle 44 is a commercial truck and the deployable resource 38 is a truck driver. In another embodiment, the vehicle 44 may be an aircraft, and the deployable resource 38 may be a pilot or crew member. The criteria for performing the task may be customized as well. For example, where the deployable resource 38 is a pilot and the vehicle 44 is an aircraft, one criterion for operating the vehicle 44 may be that the deployable resource 38 has a minimum amount of rest before operating the vehicle 44. A wearable device 40 may determine this information, for example, by monitoring movement of the deployable resource 38 over a period of time. If the wearable device 40 determines, for example, that the deployable resource 38 spent a seven-hour period in one location with minimal movement, the wearable device 40 (or the controller 36) may determine that the deployable resource 38 was asleep during this time period, thereby meeting that criterion for operating the vehicle 44.

In an alternative embodiment, the controller 36 may be operable to control access by the deployable resource 38 to a secure area (not shown). For example, if the controller 36 determines that a deployable resource 38 is permitted to access a secure area, the controller 36 may enable a locked door to be unlocked for the deployable resource 38. This may be accomplished by remotely unlocking the door, or by remotely authorizing or activating a key, keycard, an electronic key device, or other access device or component in the possession of the deployable resource 38 for gaining access to the secure area. Conversely, if the controller 36 determines that the deployable resource 38 is not permitted to access the secure area, the controller 36 may remotely lock the door, or remotely deactivate the key or other access device or component that would be used by the deployable resource 38 to access the secure area.

In another embodiment, a system for matching deployable resources with available tasks based on personal information obtained from wearable devices is disclosed. Many public and private organizations and business entities encounter situations where they need to deploy a group of resources to solve an immediate problem and they do not have directly affiliated staff to meet the immediate resource demands. Examples of these types of situations include emergency response situations, spontaneous events, and simple volunteer-centric activities. Examples of some specific dynamically deployable resources might include volunteer fire fighters, long haul truck drivers working a second job, on-call private snow plows, on-call substitute teachers, employees from affiliated businesses, air traffic controllers, medical personnel, or service industry workers. Resources often need to fit a specific profile as well as be in a defined geographic area and be fit for the task, which can make finding an appropriate resource difficult on short notice. For example, some activities have safety consideration that require healthy sleep states, physical or health parameters, and/or restrictions at the time of deployment to assure safety or minimize potential liability.

Figure 7:
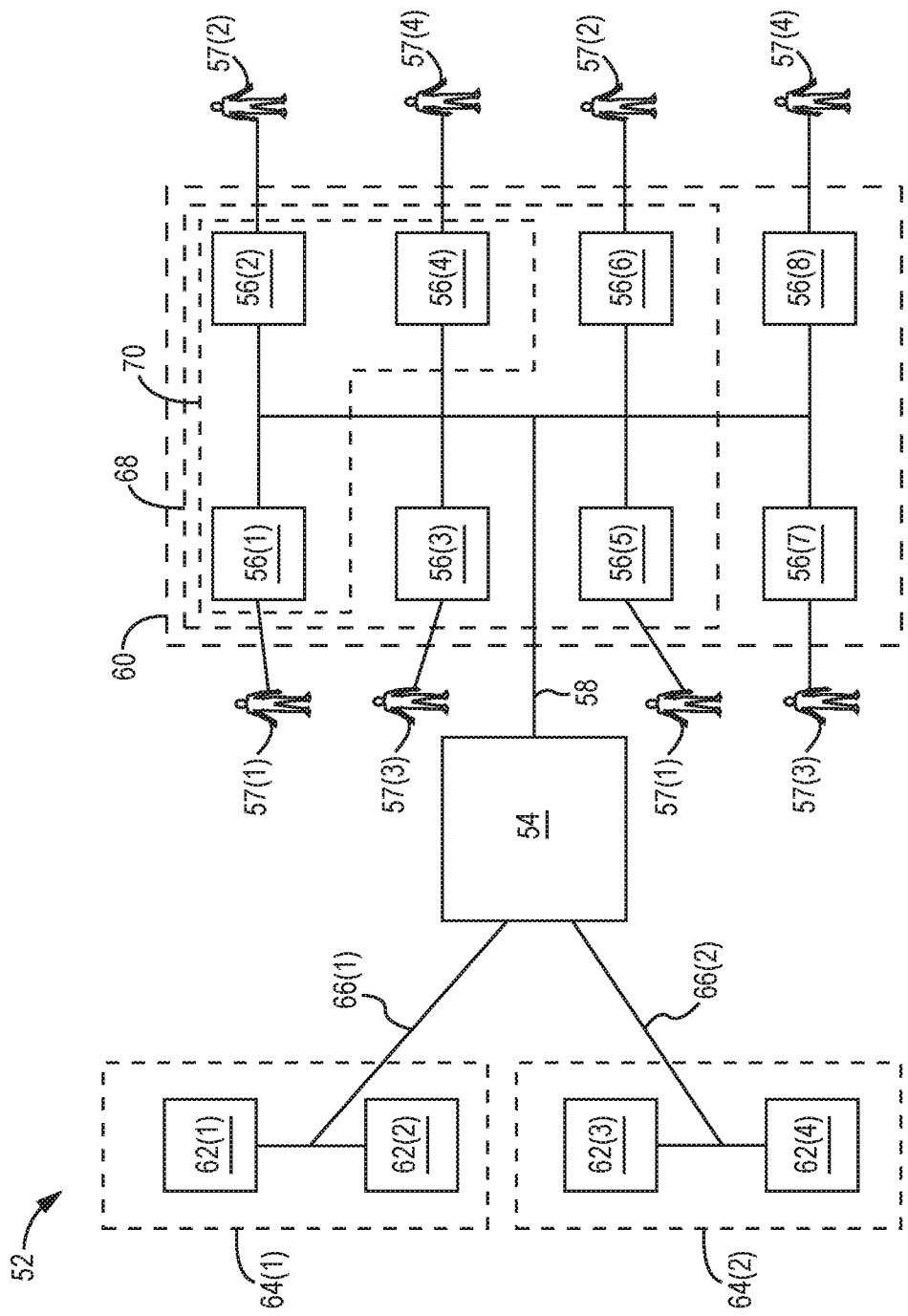
FIG. 7 illustrates a system configured to receive personal information received from wearable devices worn by a plurality of deployable resources, and to match the deployable resources with available tasks based on the personal information, according to another embodiment.

In this regard, FIG. 7 illustrates a system 52 having a processor-based controller 54 in communication with a plurality of wearable devices 56 each being worn by a deployable resource 57. The wearable devices 56 are in communication with the controller 54 via one or more communication connections 58. In this embodiment, the deployable resources 57(1)-57(8) form a resource pool 60 from which individual deployable resources 57 can be matched with one or more tasks 62. The tasks 62 may be associated with a common entity 64 or may be associated with different entities 64. For example, in this embodiment, tasks 62(1) and 62(2) are associated with one entity 64(1) while tasks 62(3) and 62(4) are associated with a different entity 64(2), with both entities 64 connected to the controller 54 via one or more communication links 66.

In this embodiment, each deployable resource 57 of a subset 68 of the resource pool 60, including deployable resources 57(1)-57(6), grants permission to the controller 54 to receive personal information from the respective wearable devices 56 being worn by the deployable resources 57. In this embodiment, for example, each deployable resource 57 may have a preexisting relationship with an entity responsible for aspects of the task, for example as an employee or a contractor. In another embodiment, one or more of the deployable resources 57 may be volunteers. In response to receiving permission from the subset 68 of deployable resources 57, the controller 54 automatically receives personal information from each deployable resource 57 of the plurality of deployable resources 57 via the wearable devices 56. The controller 54 automatically compares the personal information received from the deployable resources 57 to a selection criterion associated with a task 62. Based on the comparing, the controller 54 selects a subset 70 of deployable resources 57(1), 57(2), and 57(4) to match with one or more tasks 62, and notifies each deployable resource 57 of the selected deployable resources 57(1), 57(2), and 57(4) to request assistance with respect to the task 62.

Figure 8:
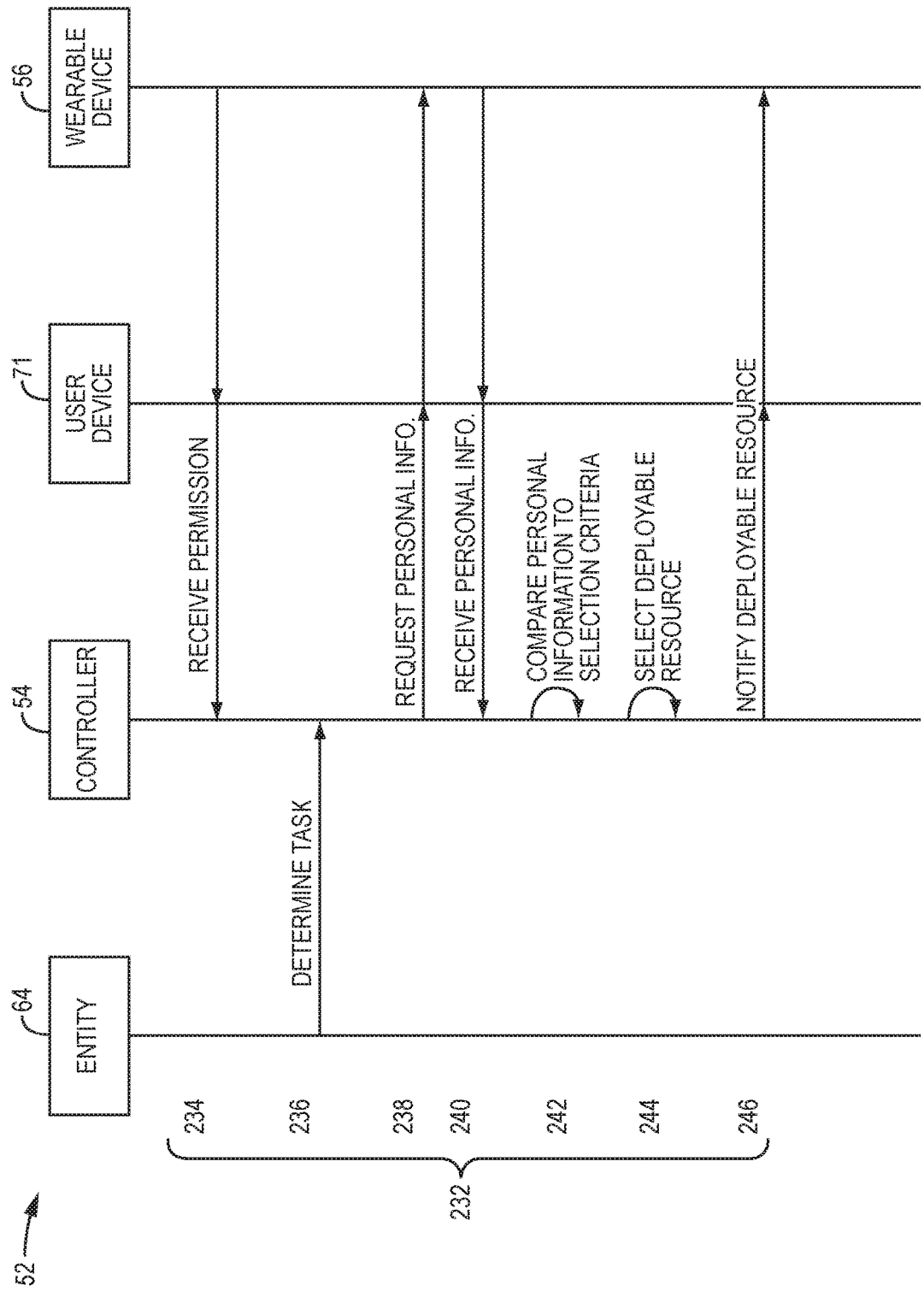
FIG. 8 is a communication diagram illustrating a method of matching a deployable resource to an available task using the system of FIG. 7, according to an embodiment.
Figure 9:
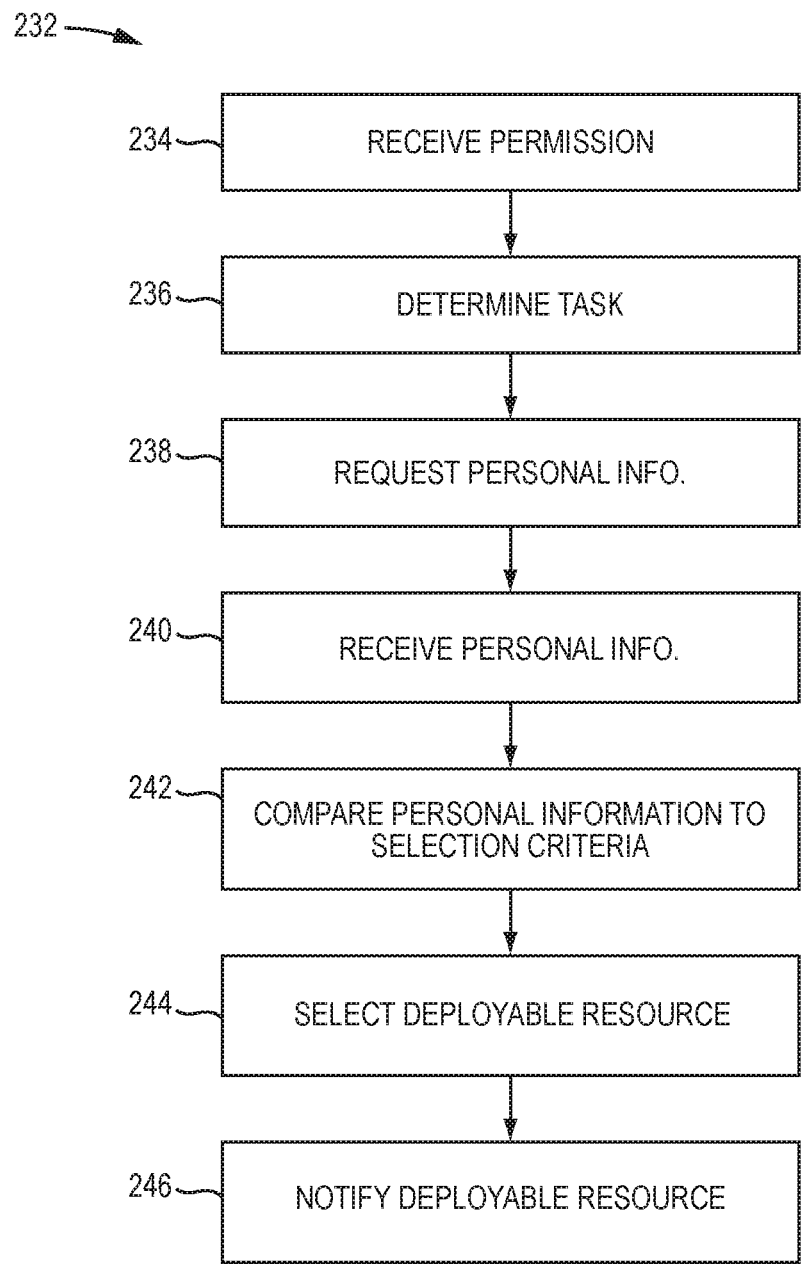
FIG. 9 is a flowchart of the method of FIG. 8, according to an embodiment.

FIG. 8 is a communication diagram illustrating a method 232 of managing deployable resources 57 using the system 52 of FIG. 7, according to an embodiment. Reference is also made to FIG. 9, which illustrates a flowchart of the method 232 of FIG. 8, according to an embodiment. In this embodiment, the controller 54 receives permission to receive personal information from the deployable resource 57 via a wearable device 56 worn by the deployable resource 57 (Block 234). The controller 54 also determines a task 62 based on information from an entity 64 associated with the task 62 (Block 236). The controller 54 requests personal information from the wearable device 56, either from the wearable device 56 directly, via a user device 71 associated with the deployable resource 57, or other method 232 (Block 238). The user device 71 and/or wearable device 56 provides the personal information to the controller 54 (Block 240), and the controller 54 compares the personal information to one or more selection criteria for the task 62 (Block 242). Based on the comparing, the controller 54 selects one or more deployable resources 57 (Block 244) and causes the deployable resource(s) 57 to be notified (Block 246). The notification can include telephonically contacting the deployable resource 57, electronically contacting the deployable resource 57 via a network-connected device, or contacting the deployable resource 57 via the respective wearable device 56, for example.

Figure 10A:
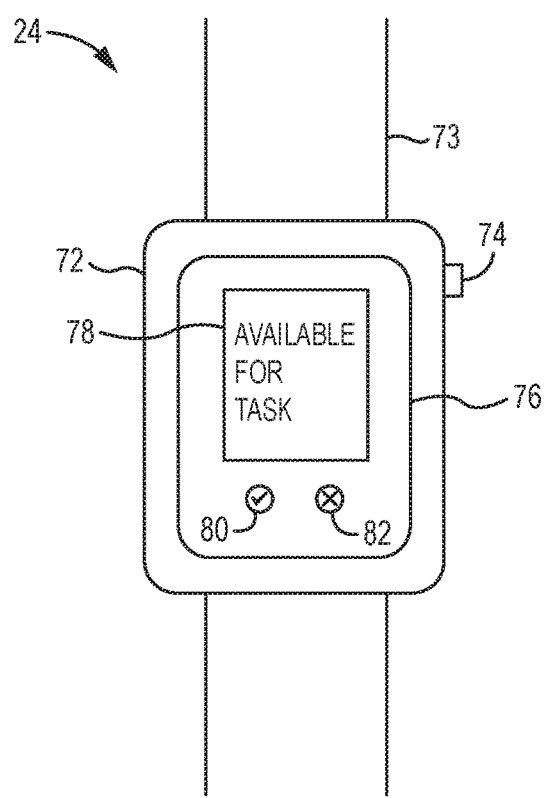
FIGS. 10A and 10B illustrate aspects of a user interface for a wearable device according to the embodiment of FIGS. 1-9, according to an embodiment.
Figure 10B:
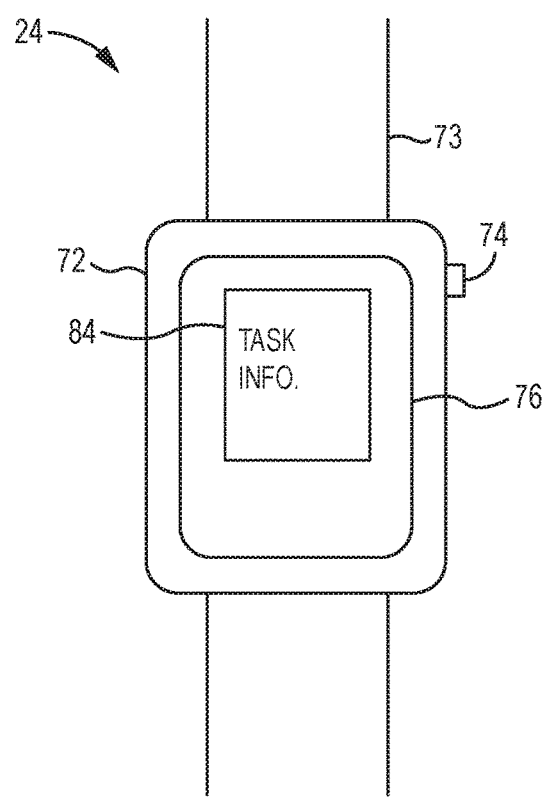

In this regard, FIGS. 10A and 10B illustrate a user interface for a wearable device, such as the wearable device 24 described above with respect to FIGS. 1-3, that enables a deployable resource 57 to send and receive information, including personal information and notifications. In this example, the wearable device 24 is a smartwatch having a body 72 for storing functional components of the wearable device 24 and a strap 73 for allowing the deployable resource, such as deployable resource 25 of FIGS. 1-3, to wear the wearable device 24. The body 72 includes a dial 74 and/or other physical interface elements, and a touchscreen 76 for displaying information to the deployable resource 25 and receiving input therefrom. In the embodiment of FIG. 10A, the deployable resource 25 is being notified of a request for assistance with a task via a graphical alert and/or text 78, and has the option to accept or decline the request via a respective graphical accept button 80 and decline button 82. Other types of alerts, such as an audible alert or physical stimulus, e.g., vibration, may also be used. Referring now to FIG. 10B, if the deployable resource 25 accepts the request, a new message 84 is provided with further information about the accepted task.

Figure 11:
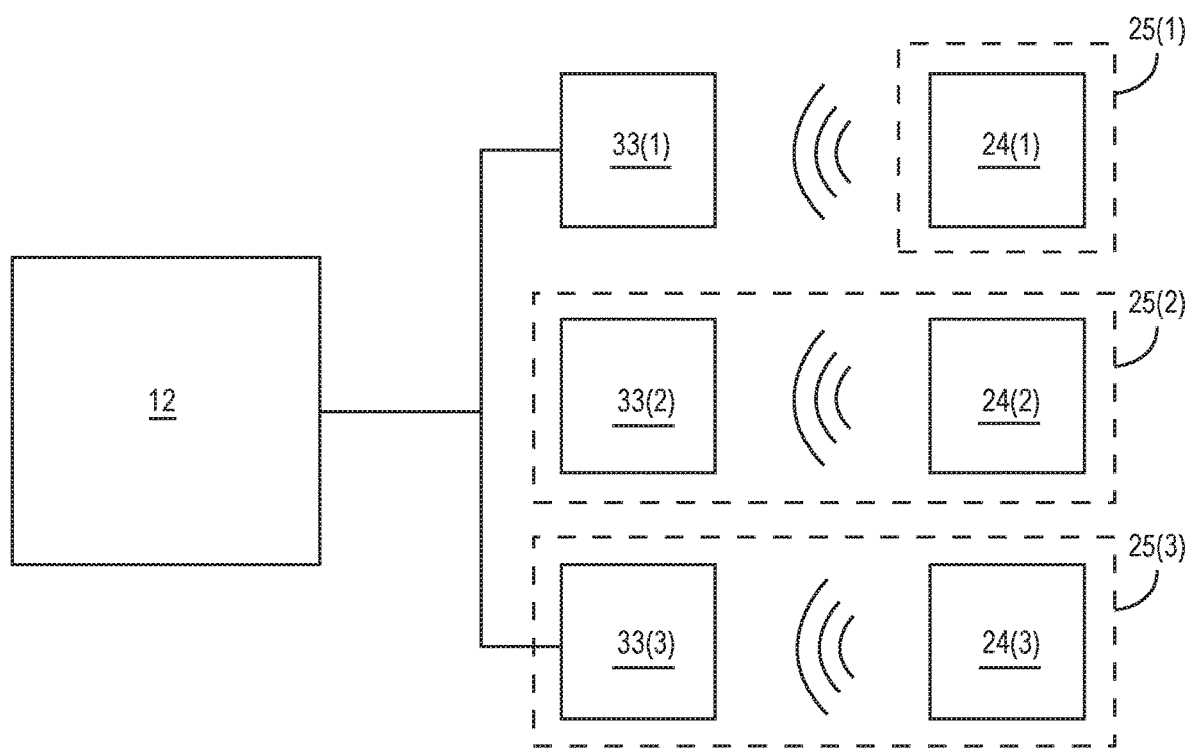
FIG. 11 illustrates a system for communicating with a wearable device according to the embodiment of FIGS. 10A and 10B, via an intermediary computing device, including a personal computer or smartphone.

As discussed above with respect to the embodiments of FIGS. 1-9, the wearable device, such as wearable device 24 of FIGS. 1-3, is able to provide personal information to the controller 12 in different ways. In this regard, FIG. 11 illustrates a portion of the system 10 of FIGS. 1-3 including intermediary user devices 33 in communication with the controller 12. The user devices 33 selectively communicate with the respective wearable devices 24, for example via a wired or wireless connection as discussed above, to receive and relay the personal information, and/or to provide messages received from the controller 12 to the wearable devices 24. In this embodiment, user device 33(1) is a personal computer associated with the deployable resource 25(1), with the wearable device 24(1) worn by the deployable resource 25(1) being configured to periodically synchronize with the user device 33(1). Meanwhile, user device 33(2) in this embodiment is a smartphone intended to be carried by the deployable resource 25(2) while the wearable device 24(2) is also being worn by the deployable resource 25(2). Likewise, user device 33(3) may be another type of portable computing device that is carried by the deployable resource 25(3) while wearing the wearable device 24(3).

Figure 12:
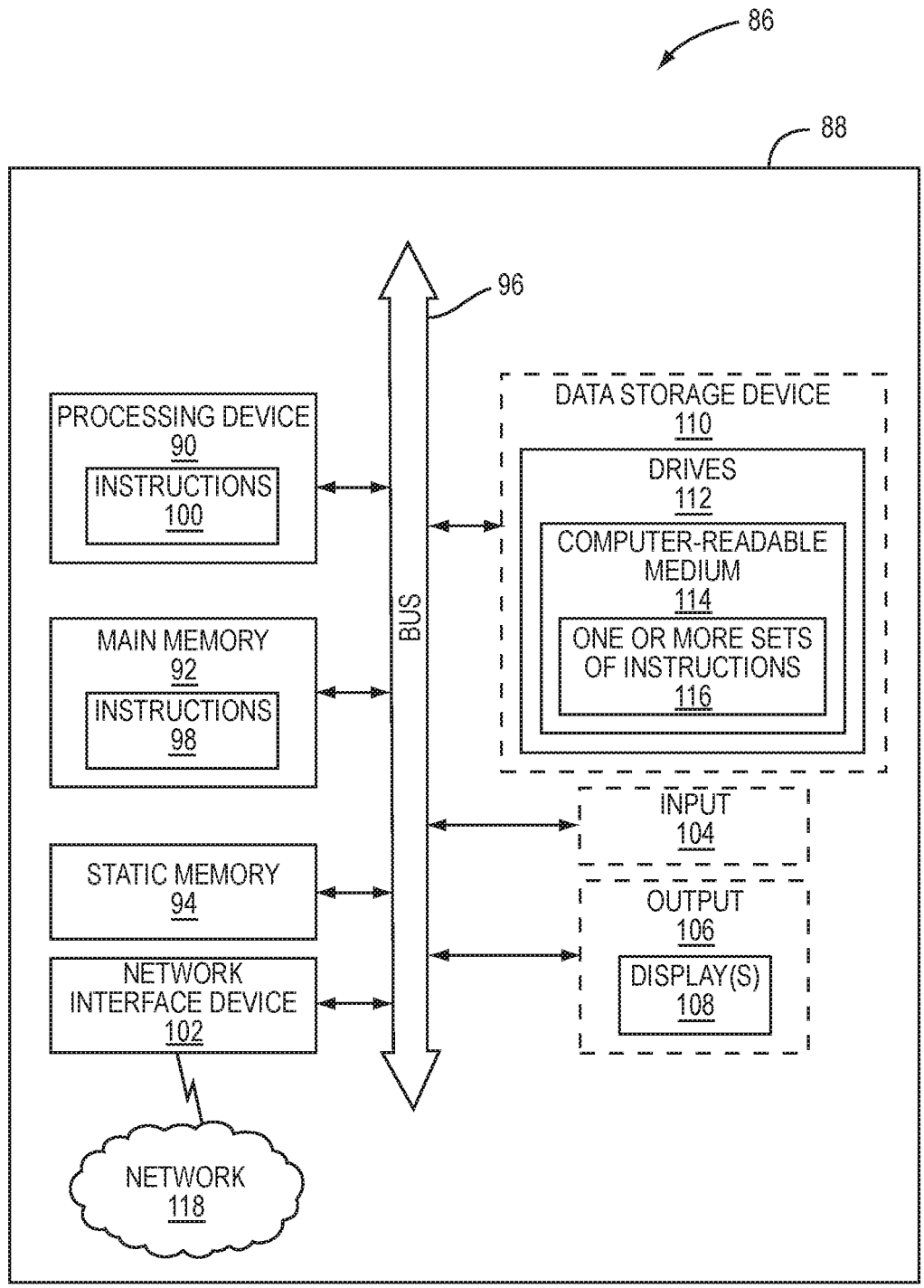
FIG. 12 is a block diagram of an exemplary processor-based system that can include the processor-based controller, wearable devices, or other devices disclosed by FIGS. 1-11.

FIG. 12 provides a schematic diagram representation of a processing system 86 in the exemplary form of an exemplary computer system 88 adapted to execute instructions from an exemplary non-transitory computer-readable medium to perform the functions described herein. In this regard, the processing system 86 may comprise the computer system 88 within which a set of instructions for causing the processing system 86 to perform any one or more of the methodologies discussed herein may be executed. The processing system 86 may be connected (as a non-limiting example, networked) to other machines in a local area network (LAN), an intranet, an extranet, or the Internet. The processing system 86 may operate in a client-server network environment, or as a peer machine in a peer-to-peer (or distributed) network environment. While only a single processing system 86 is illustrated, the terms "controller" and "server" shall also be taken to include any collection of machines that individually or jointly execute a set (or multiple sets) of instructions to perform any one or more of the methodologies discussed herein. The processing system 86 may be a server, a personal computer, a desktop computer, a laptop computer, a personal digital assistant (PDA), a computing pad, a mobile device, or any other device and may represent, as non-limiting examples, a server or a user's computer.

The exemplary computer system 88 includes a processing device or processor 90, a main memory 92 (as non-limiting examples, read-only memory (ROM), flash memory, dynamic random access memory (DRAM) such as synchronous DRAM (SDRAM), etc.), and a static memory 94 (as non-limiting examples, flash memory, static random access memory (SRAM), etc.), which may communicate with each other via a bus 96. Alternatively, the processing device 90 may be connected to the main memory 92 and/or the static memory 94 directly or via some other connectivity means.

The processing device 90 represents one or more processing devices such as a microprocessor, central processing unit, or the like. More particularly, the processing device 90 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 90 is configured to execute processing logic in instructions 98 and/or cached instructions 100 for performing the operations and steps discussed herein.

The computer system 88 may further include a communications interface in the form of a network interface device 102. It also may or may not include an input 104 to receive input and selections to be communicated to the computer system 88 when executing instructions. It also may or may not include an output 106, including but not limited to display(s) 108, a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 88 may or may not include a data storage device 110 that includes using drive(s) 112 to store functions herein described in non-transitory computer-readable medium 114 on which is stored one or more sets of instructions 116 (e.g., software) embodying any one or more of the methodologies or functions described herein. The one or more sets of instructions 116 may also reside, completely or at least partially, within the main memory 92 and/or within the processing device 90 during execution thereof by the computer system 88, the main memory 92, and the processing device 90 also constituting machine-accessible storage media. The instructions 98, 100, and/or 116 may further be transmitted or received over a network 118 via the network interface device 102. The network 118 can be an intra-network or an inter-network.

While the non-transitory computer-readable medium 114 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 116. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, and optical and magnetic media.

Devices and systems according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the embodiments disclosed herein may be implemented as electronic hardware, instructions stored in memory or in another non-transitory computer-readable medium and executed by a processor or other processing device, or combinations of both. The master devices, and slave devices described herein may be employed in any circuit, hardware component, integrated circuit (IC), or IC chip, as non-limiting examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a digital signal processor (DSP), an Application Specific Integrated Circuit (ASIC), a field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of matching deployable resources with available tasks comprising:
   automatically determining, via a processor-based controller in communication with one or more contact centers, a load parameter for a contact center;
   automatically comparing, via the processor-based controller, the load parameter to a threshold value for the contact center, the threshold value based on at least a service level associated with the contact center;
   in response to the load parameter exceeding the threshold value, automatically connecting, via the processor-based controller, to a plurality of wearable devices configured to be worn by a plurality of deployable resources;
   selecting, via the processor-based controller, a first subset of deployable resources from the plurality of deployable resources, the first subset of deployable resources distributed at different locations from the contact center;
   receiving permission, at the processor-based controller, from one or more deployable resources of the first subset of deployable resources to receive location information from each deployable resource;
   automatically receiving, via the processor-based controller, the location information from the one or more deployable resources of the first subset of deployable resources via the respective wearable devices communicatively connected to the processor-based controller, the location information based on information determined by the respective wearable device while the wearable device is being worn by a respective deployable resource;

automatically comparing, via the processor-based controller, the location information received from the first subset of deployable resources to a selection criterion associated with a task associated with the contact center, the selection criterion corresponding to a physical distance between a location of each of the one or more deployable resources and the contact center;

selecting, based on the comparing of the location information to the selection criterion, via the processor-based controller, a second subset of deployable resources from the first subset of deployable resources;

automatically sending, via the processor-based controller, a first electronic communication to each deployable resource of the second subset of deployable resources, the first electronic communication containing a request for assistance from the second subset of deployable resources with respect to the task; and preventing, via the processor-based controller, deployable resources in the first subset of deployable resources but not in the second subset of deployable resources from engaging in the task, such that the first subset of deployable resources is conserved from being used.

2. The method of claim 1, wherein the plurality of deployable resources comprises a plurality of employees of an entity responsible for the task.

3. The method of claim 1, wherein the plurality of deployable resources comprises a plurality of contractors of an entity responsible for the task.

4. The method of claim 1, wherein the plurality of deployable resources comprises a plurality of volunteers of an entity responsible for the task.

5. The method of claim 1, further comprising:
automatically receiving, at the processor-based controller, personal information from each deployable resource, wherein the personal information comprises biometric information about a deployable resource wearing the wearable device.

6. The method of claim 5, wherein the personal information comprises a level of physical exertion of a deployable resource wearing the wearable device.

7. The method of claim 5, wherein the personal information comprises information about a rest state of a deployable resource wearing the wearable device.

8. The method of claim 5, wherein the personal information comprises a blood alcohol content (BAC) level of a deployable resource wearing the wearable device.

9. The method of claim 5, wherein the personal information comprises a predetermined criterion for a deployable resource wearing the wearable device associated with the task.

10. The method of claim 9, wherein the predetermined criterion further comprises a prerequisite legal criterion.

11. The method of claim 1, wherein selecting comprises:
ranking the first subset of deployable resources based on the comparing; and
selecting, based on the ranking, the second subset of deployable resources.

12. The method of claim 1, wherein selecting comprises:
categorizing the first subset of deployable resources based on the comparing; and
selecting, based on the categorizing, the second subset of deployable resources.

13. The method of claim 1, wherein electronically contacting each deployable resource comprises telephonically contacting a deployable resource.

14. The method of claim 1, wherein electronically contacting each deployable resource comprises contacting a deployable resource via a network-connected device.

15. The method of claim 1, wherein electronically contacting each deployable resource comprises contacting a deployable resource via the respective wearable device.

16. The method of claim 1, wherein electronically contacting each deployable resource comprises providing a graphical alert to a deployable resource.

17. The method of claim 1, wherein electronically contacting each deployable resource comprises providing an audible alert to a deployable resource.

18. The method of claim 1, further comprising:
receiving a reply from a deployable resource of the second subset of deployable resources; and
assigning the deployable resource of the second subset of deployable resources to the task.

19. A system for matching deployable resources with available tasks comprising:
a plurality of wearable devices, each of the plurality of wearable devices configured to be worn by one of a plurality of deployable resources, each of the plurality of wearable devices configured to determine location information about a respective deployable resource based on information determined by a respective wearable device while the respective wearable device is being worn by the respective deployable resource; and
a processor-based controller configured to:
automatically determine a load parameter for a contact center;
automatically compare the load parameter to a threshold value for the contact center, the threshold value based on at least a service level associated with the contact center;
in response to the load parameter exceeding the threshold value:
connect to the plurality of wearable devices;
select a first subset of deployable resources from the plurality of deployable resources, the first subset of deployable resources distributed at different locations from the contact center;
receive permission from one or more deployable resources of the first subset of deployable resources to receive the location information from the respective deployable resource;
automatically receive the location information from the one or more deployable resources of the first subset of deployable resources via the respective wearable devices configured to be worn by the plurality of deployable resources and communicatively connected to the processor-based controller;
automatically compare the location information received from the first subset of deployable resources to a selection criterion associated with a task associated with the contact center, the selection criterion corresponding to a physical distance between a location of each of the one or more deployable resources and the contact center;
select, based on the comparing of the location information to the selection criterion, a second subset of deployable resources from the first subset of deployable resources;
cause each deployable resource of the second subset of deployable resources to be electronically contacted automatically via a first electronic communication to request assistance from the second subset of deployable resources with respect to the task; and cause each deployable resources in the first subset of deployable resources but not in the second subset of deployable resources to be prevented from being deployed in engaging in the task, such that the first subset of deployable resources is conserved from being used.

20. A non-transitory computer-readable medium storing one or more programs, the one or more programs comprising instructions, which when executed by an electronic device cause the electronic device to implement a method for matching deployable resources with available tasks, comprising:

automatically determining, via a processor-based controller in communication with one or more contact centers, a load parameter for a contact center;

automatically comparing, via the processor-based controller, the load parameter to a threshold value for the contact center, the threshold value based on at least a service level associated with the contact center;

in response to the load parameter exceeding the threshold value, automatically connecting, via the processor-based controller, to a plurality of wearable devices configured to be worn by a plurality of deployable resources;

selecting, via the processor-based controller, a first set of deployable resources from a plurality of deployable resources, the first subset of deployable resources distributed at different locations from the contact center;

receiving permission, via the processor-based controller, from one or more deployable resources of the first subset of deployable resources to receive location information from each deployable resource;

automatically receiving, via the processor-based controller, the location information from the one or more deployable resources of the first subset of deployable resources via the respective wearable devices communicatively connected to the processor-based controller, the location information based on information determined by each respective wearable device while each respective wearable device is being worn by a respective deployable resource;

automatically comparing, via the processor-based controller, the location information received from the first subset of deployable resources to a selection criterion associated with a task associated with the contact center, the selection criterion corresponding to a physical distance between a location of each of the one or more deployable resources and the contact center;

selecting, based on the comparing of the location information to the selection criterion, via the processor-based controller, a second subset of deployable resources from the first subset of deployable resources;

automatically sending, via the processor-based controller, a first electronic communication to each deployable resource of the second subset of deployable resources, the first communication containing a request for assistance from the second subset of deployable resources with respect to the task; and preventing, via the processor-based controller, deployable resources in the first subset of deployable resources but not in the second subset of deployable resources from engaging in the task, such that the second subset of deployable resources is conserved from being used.

* * * * *